United States Patent [19]

Cattaneo et al.

[11] 4,114,376
[45] Sep. 19, 1978

[54] SERVO-ASSISTED HYDRAULIC BRAKING SYSTEM

[75] Inventors: Maurizio Cattaneo, Turin; Antonino Bertone, Sant'Antonino (Vercelli), both of Italy

[73] Assignee: FIAT Societa per Azioni, Turin, Italy

[21] Appl. No.: 726,322

[22] Filed: Sep. 24, 1976

[30] Foreign Application Priority Data

Oct. 10, 1975 [IT] Italy .................. 69529 A/75

[51] Int. Cl.² ............................................ B60T 13/12
[52] U.S. Cl. ................................ 60/548; 60/555; 60/562; 60/582; 91/460
[58] Field of Search ............... 60/548, 552, 555, 562, 60/579, 581, 585, 592, 593, 582; 91/460; 137/569

[56] References Cited

U.S. PATENT DOCUMENTS

| 2,945,352 | 7/1960 | Stelzer | 60/548 |
|---|---|---|---|
| 2,976,686 | 3/1961 | Stelzer | 60/555 |
| 3,064,431 | 11/1962 | Schnell | 60/548 |
| 3,638,427 | 2/1972 | Meyers | 60/548 |
| 3,729,931 | 5/1973 | Shilton | 60/555 |
| 3,776,101 | 12/1973 | Nussbaumer | 91/446 |
| 3,797,246 | 3/1974 | Belart | 60/555 |
| 3,818,705 | 6/1974 | Thomas | 60/548 |
| 3,894,390 | 7/1975 | Belart | 60/552 |
| 3,976,171 | 8/1976 | Belart | 60/552 |

*Primary Examiner*—Martin P. Schwadron
*Assistant Examiner*—Abraham Hershkovitz
*Attorney, Agent, or Firm*—Sughrue, Rothwell, Mion, Zinn and Macpeak

[57] ABSTRACT

Servo-assisted hydraulic braking system of the type in which brake pedal pressure is reinforced by a pressure dependent thereon and fed to a master cylinder driving piston by a distributor device which is fed with fluid under pressure from a pressure source and control pressure from control chambers defined by plungers within the master cylinder itself, which plungers are displaced directly or indirectly by the displacement of the driving piston of the master cylinder. The distributor plungers are balanced so that for a given brake pedal pressure they feed through a certain reinforcing pressure and then close off the driving piston chamber from the pressure source, locking in the reinforcing pressure so far applied, so that variations in the pressure generated by the pressure generating device are not fed back to the brake pedal via the driving piston of the master cylinder.

5 Claims, 3 Drawing Figures

SERVO-ASSISTED HYDRAULIC BRAKING SYSTEM

The present invention relates to a servo-assisted hydraulic braking system, and particularly to a system in which the servo is incorporated in the master cylinder. Servo-assisted braking systems are used to reduce the force that must be exercised on the brake pedal of a motor vehicle in such a way as to obtain good braking with the driver exercising a minimum of force. This is achieved in a number of ways using hydraulic, pneumatic or mechanical systems or any combination of these.

One type of hydraulic servo-assisted braking system is described in U.S. Pat. No. 2,687,189 granted to S. Schnell. This device uses the pressure created by a volumetric pump when the return circuit to an oil reservoir is obstructed in order to generate a pressure which is channelled so that it acts on the piston of the master cylinder of the braking system in a sense such as to reduce the force required on the brake pedal. Obstruction of the return circuit of the volumetric pump to the reservoir is obtained by the displacement of a piston moved by a control pressure generated by movement of a plunger operated by the brake pedal, which control pressure, on its own, can also operate the brakes should there be any breakdown in the servo system.

One of the main disadvantages of devices of this type, is that the volumetric pump, in operation, creates a vibration due to its pumping action and the simple interception of the return circuit does not damp out these vibrations which therefore can be sensed at the brake pedal. A device of this kind is also described in Italian Patent Application 69876-A/74 filed Sept. 25, 1974 by the same applicant in which there is a device for restricting the return conduit of a volumetric pump whereby to increase the pressure upstream of the device, this pressure being used in the braking system to operate the brakes. This device also suffers from the disadvantage mentioned above of vibrations from the pump operation being fed back to the brake pedal. The main object of the present invention is to provide a servo-assisted braking system of the same general type as that described above, but in which there are no jerky variations in pressure fed back to the brake pedal while nevertheless providing a servo pressure which is proportional to the force exerted on the brake pedal.

According to the present invention, there is provided a servo-assisted hydraulic braking system having a master cylinder provided with first and second master cylinder plungers which define between them a first chamber and one of which defines between itself and the end wall of the master cylinder a second chamber, and a driving piston acted on by the brake pedal and displaceable thereby, such displacement also causing displacement of the said first and second master cylinder plungers to control the pressure in the said first and second master cylinder chambers, in which there is further provided a distributor device connected to a pressure generator and controlled by the pressure in the said first and second master cylinder chambers to feed fluid under pressure from the said pressure generator to reinforce the force applied to the driving piston by the brake pedal.

Three embodiments of the present invention will now be more particularly described, by way of example, with reference to the accompanying drawings, in which.

Figure 1:
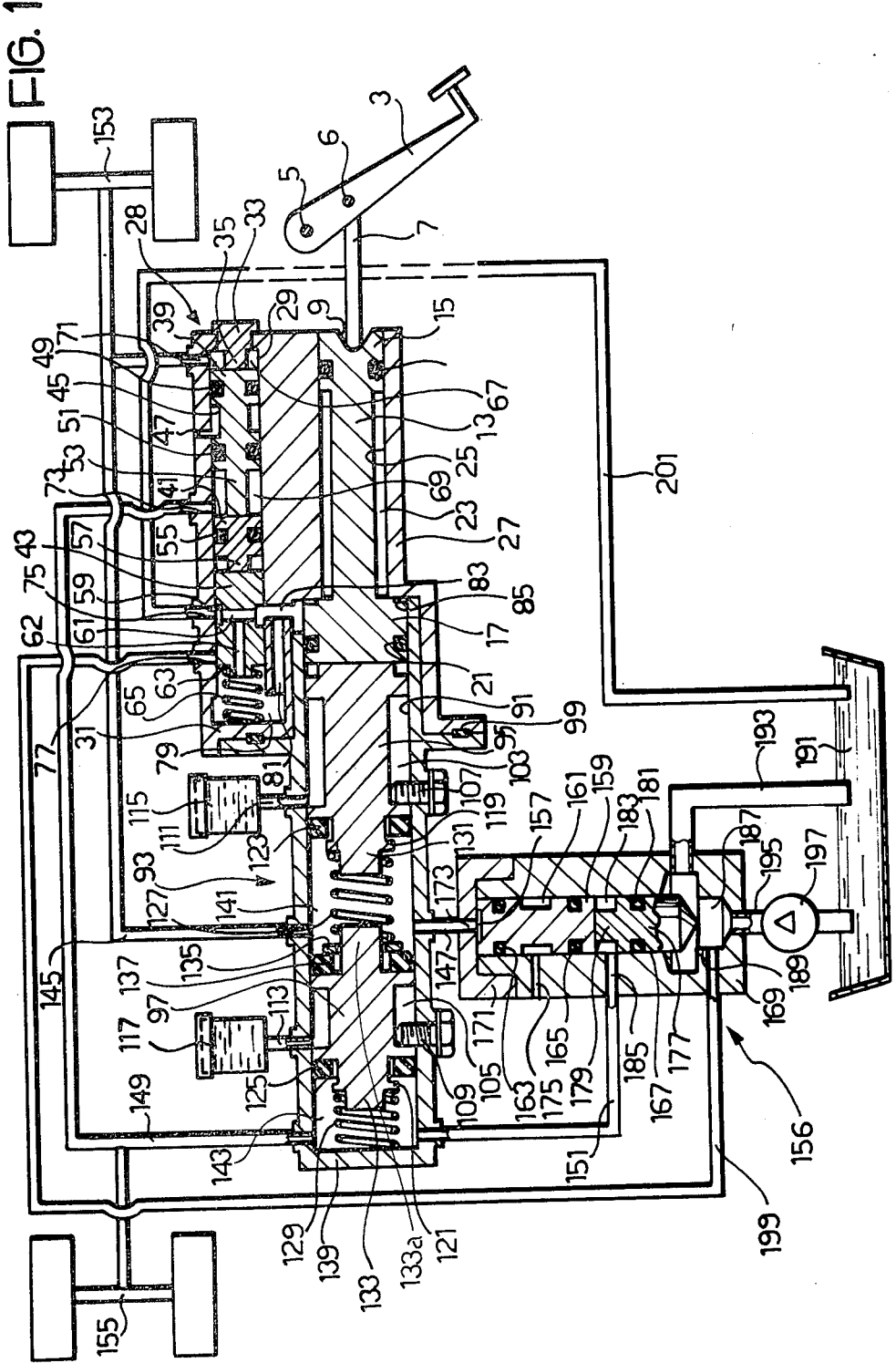
FIG. 1 is a partly schematic, partly diagrammatic view of a first embodiment of the invention.

Referring now to FIG. 1, there is shown a brake pedal 3 pivoted at a point 5 and pivotally connected by a pivot 6 to one end of a push rod 7 the other end of which rests in a conical recess 9 in a plunger 13 having two enlarged ends 15 and 17 of different diameters and provided with two sealing rings 19 and 21. One enlarged end 15 slides in a bore 25 in a distributor body 27 which is attached to one end of a master cylinder 93 having a main bore 91 in which slides the other enlarged end 17 of the plunger 13. Within the axial bore 25 of the body 27, which bore has the same diameter as the enlarged end 15 of the plunger 13 the body of the plunger 13 defines, with the axial bore 25, an annular chamber 23. The distributor body 27 forms part of a pressure distrubutor device generally indicated 28, and has within it a second axial bore 29 of the body 27, closed at one end by a transverse wall 31 of the body 27 and at the other by a plug 33 having a central axial projection 35 on the inside; within the bore 29 slide three plungers, two of which 39 and 41, are control plungers and one of which, 43, is a distribution plunger.

The first plunger 39, which is nearest the plug 35 in the end of the bore 29, has an annular groove 45 in its middle part and when the plunger 39 is abutting the plug 35 this can communicate with the atmosphere through a hole 47 in the wall of the body 27. The two ends of the plunger 39 are provided with two sealing rings 49 and 51 and the end of the plunger 39 remote from the plug 35 has an axial extension 53 which, in the position shown in FIG. 1, abuts the second plunger 41 which is shorter than the first plunger 39 and has a single sealing ring 55 and an axial extension 57 projecting away from the first plunger 39 and contacting, in the position shown in FIG. 1, the third plunger 43 which has an annular groove 59 part way along its length and a transverse diametral hole 61 which intersects an axial bore 62 which opens into the end face of the plunger 43 remote from the plunger 41. This end face of the plunger 43 has a slight projection 63 over which fits one end of a spring 65 the other end of which engages the transverse end wall 31 of the body 27 and which thrusts the three plungers in the bore 29 against each other and presses the first plunger 39 against the projection 35 of the plug 33.

The projection 35 of the plug 33 defines, with the end wall of the first plunger 39 a first annular chamber 67 within the bore 29, and a second annular chamber 69 is defined in the bore 29 by the projection 53 of the first plunger 39 and the adjacent end face of the second plunger 41. The first annular chamber communicates via a conduit 79 with the braking circuit 153 of the rear wheels of the vehicle and the second annular chamber communicates via a conduit 73 with the braking circuit 155 of the front wheels of the vehicle.

Adjacent the position of the annular groove 59 in the third plunger, in the rest position shown in FIG. 1, is a further passage 75 in the side wall of the body 27, and there is another passage 77 in the side wall of the body 27 at the point where the annular groove 59 is located when the third plunger 43 has been displaced along the bore 29 by the maximum amount against the action of the spring 65. The distance between the two passages 75 and 77 is greater than the width of the groove 59.

A chamber 79, defined in the bore 29 by the third plunger 43 and the end wall 31 is in communication through an axial passageway 81 with an internal passage 83 in the side wall of the body 27 at a point diametrically opposite that of the passage 75 and adjacent the enlarged end 17 of the plunger 13. This enlarged end 17 actually slides within the axial bore 91 of the master cylinder 93 and abuts, in the rest position, against a shoulder of the extension body 27. The face of the enlarged end 17 of the plunger 13 which abuts the shoulder in the body 27 has an annular peripheral rebate 85. The sealing ring 21 seals the enlarged end 17 of the plunger 13 in the axial bore 91 of the master cylinder 93 and the end face of the enlarged end 17 contacts one of two master cylinder plungers 95 and 97 which are both slidable along the bore 91 of the master cylinder 93. The master cylinder 93 is joined to the distributor body 27 in a sealed manner with the aid of a gasket 99 such that the axis of the bore 25 of the body 27 coincides with the axis of the bore 91 of the master cylinder 93. The two master cylinder plungers have respective annular recesses 103 and 105 into which project the ends of respective screws 107 and 109 which are screwed into the cylinder wall 93 and which act as abutment stops to limit the displacement of the master cylinder plungers 95, 97 along the bore 91. The annular recesses 103, 105 of the master cylinder plungers 95, 97 define, with the wall of the master cylinder 93, respective annular chambers which communicate, via conduits 111 and 113 with respective brake fluid reservoirs 115 and 117. The two master cylinder plungers 95, 97 have respective axial projections 131, 133 extending away from the plunger 13, and each of the two plungers, at this end, carry respective sealing rings 123, 125 held in place by two radial flanges 119 and 121. The inner diameter of the sealing rings 123 and 125 is less than the diameter of the flanges but greater than the diameter of the part of the master cylinder plunger 95, 97 on which they are carried and their width is slightly less than the width of this said part of the plunger 95, 97.

In the periphery of those parts of the master cylinder plungers 95, 97 which separate the sealing rings 123 and 125 from the grooves 103 and 105 there are millings (which can not be seen in the drawings) which allow the passage of brake fluid. Against the retaining flanges 119 and 121 of the master cylinder plungers, and surrounding the axial projections 131, 133 engage the ends of respective springs 127 and 129. The other end of the spring 127 fits over an axial extension 133a of the plunger 97, which extends towards the plunger 95, and is pressed against a washer 135 which abuts a sealing ring 137 on the plunger 97. The other end of the spring 129 presses against a transverse end wall 139 of the master cylinder 93.

The first and the second master cylinder plungers 95, 97 define between them a chamber 141 in the bore 91, and the second plunger 97 and the end wall 139 define a further chamber 143. The chamber 141 communicates, via a conduit 145 with the passageway 71 leading to the chamber 67 and with the braking circuit 153 of the rear wheels of the vehicle, and the other chamber 143 communicates, via a conduit 149 with the passageway 73 leading to the chamber 69 and with the braking circuit 155 of the front wheels of the vehicle. The chamber 143 also communicates, via a conduit 151 with a pressure generating device 156 which is also connected, by a conduit 147, to the chamber 141 between the two plungers 95 and 97.

The pressure generating device comprises a cylinder 169 having an end cap 171 secured to the cylinder 169 and having an opening 173 with which the conduit 147 communicates. The cylinder 169 has a bore 167 along which slides a first plunger 159 having a recess 157 in the end thereof facing the opening 173. The plunger 159 has an annular groove midway along its length forming, with the bore 167 an annular chamber 161 which is sealed at each end by sealing rings 163 and 165 around the plunger 159. Aligned with the annular chamber 161 is a hole 175 in the side wall of the cylinder 169, which hole is so positioned that the chamber 161 is at all times in communication with the atmosphere. A second plunger 177 is housed slidably in the bore 167 between the first plunger 159 and the end of the cylinder 169 remote from the end cap 171. The plunger 177 has an axial extension 179 projecting towards the first plunger 159 and a sealing ring 181 at a mid point. The end of the second plunger 177 remote from the first plunger 159 is conical. An annular chamber 183 is defined by the axial extension 179 between the first and the second plungers, and this chamber communicates through an opening 185 in the side wall of the cylinder 169 with the conduit 151. The conical end of the second plunger 177 projects into a second chamber 187 having two parts, one of larger diameter than the axial bore 167 and one of smaller diameter than the axial bore 167, the two parts meeting at a circular edge 189. A conduit 193 links the larger diameter part of the chamber 187 with a brake fluid reservoir 191 and a conduit 195 links the smaller diameter part of the chamber 187 with the outlet of a volumetric pump 197 the inlet of which draws fluid from the reservoir 191. A conduit 199 links the smaller diameter part of the chamber 187 with the passage 77 in the wall of the extension body 27 adjacent the plunger 43. The reservoir 191 is also linked by a conduit 201 to the passage 75 in the wall of the extension body 27 adjacent the transverse passage 61 in the plunger 43.

The device described in relation to FIG. 1 operates as follows. At rest the component parts of the system adopt the positions shown in FIG. 1 and the brakes of the front and rear wheel braking circuits 153, 155 are not operated. Upon depression of the brake pedal 3 the plungers 13 and 95 are advanced along the respective bores 25 and 91 thereby increasing the pressure of the brake fluid present in the chamber 141: this increase in pressure causes displacement of the plunger 97 thereby increasing the pressure of the brake fluid in the chamber 143 to the same extent. The pressure in the two chambers 141 and 143 is transferred through conduits 145 and 149 and acts on the braking circuits 153 and 155 causing the braking of the wheels; the pressure is also transferred through passages 71 and 73 to the chambers 67 and 69 in the bore 29 with the result that the plungers 39 and 41 are thrust to the left of the drawing and in their turn cause the displacement of plunger 43 which closes communication between the passage 83 and the passage 75 thus cutting off communication between the chamber 23 and the discharge conduit 201 which had opened with the displacement to the left of the plunger 13. In the same way, the pressure in chamber 141 is communicated, via the conduit 147 and passage 173 to the chamber 157, and the pressure in the chamber 143 is communicated, via the conduit 151 and passage 185 to the annular chamber 183 thereby displacing both the plungers 159 and 177 away from the end cap 171 of the cylinder 169 of the pressure generating device 156 until the conical end of the plunger 177 presses against the edge 189 closing off communication between the outlet of the pump 197 and the discharge conduit 193 and causing an increase in the pressure in the conduit 199 leading to the passage 77 in the wall of the body 27. The plunger 43 at this stage has been displaced by the effect of the thrust of plungers 71 and 73 as described above, so that the passages 61 and 62 are in communication with the passage 77 and therefore the pressure in conduit 199 is fed through chamber 79, along passages 81 and 83 and into the chamber 23 which is open to the passage 83 due to the displacement of the plunger 13. The pressure in the chamber 23 acts on the enlarged end 17 (which is greater in area than the opposite enlarged end 15) to assist the thrust of the brake pedal against the action of the springs 127 and 129. When the plunger 13 has been displaced to such an extent that the pressure in chamber 23 is equal to the pressure in chambers 141 and 143 no further movement of the plunger 13 takes place but the pressure in conduit 199 generated by the pump 197 urges the plunger 43 together with the other plungers 39 and 41 (assisted by the spring 65) to displace back towards their original positions. They in fact reach a pressure-balanced position somewhat spaced from their original positions, but the distribution plunger 43 blocks passage 77 so that no more fluid is pumped into chamber 23; at the same time the passage 75 is also blocked by the plunger 43 and thence the discharge from the chamber 23 along conduit 207 is also prevented. In this way, that is by keeping the passage 77 closed, the unavoidable vibrations produced by the operation of the pump are prevented from being transmitted back to the brake pedal.

By increasing the pressure on the brake pedal the same cycle of operations is repeated, ending with a new stabilisation of pressure first in chambers 23, 141 and 143 and then in chambers 79, 69 and 67, with an increase in the braking pressure in the circuits 153, 155. The subsidiary plungers 39, 41, 43 therefore make it possible to have a servobraking action using a pump to generate the servo assisting pressure without, as in previous such systems, having the disadvantage that vibrations due to variations of pressure produced by the pump itself are transmitted back to the brake pedal.

When the pressure on the brake pedal 3 is reduced, the pressure in chambers 141 and 143 falls, and thus the pressure in chambers 67 and 69 also falls. As a consequence the plunger 43 will be urged by the spring 65 towards the starting position, and will partly open the passage 75, allowing some of the fluid in chamber 23 to discharge along conduit 201 thereby reducing the pressure on the plunger 13. At the same time, the pressure in the conduit 199 will reduce due to the fact that the plunger 177 of the pressure generating device 156 will be pressed less firmly onto the edge 189 as a result of a reduction of pressure in the chambers 183 and 157 so that some of the brake fluid can leak past the conical end of the plunger 177 into the discharge conduit 193. A new pressure-balanced position of the distributor plunger 43 is thus established for the new conditions.

When the brake pedal is released entirely the pressure in the chambers 141 and 143 falls to atmospheric pressure, and as a consequence all the plungers which were displaced under the action of the increased pressure within these chambers will return to their original positions. The chamber 23 can then discharge through the passage 83, across the transverse passage 61 in the plunger 43, and through the passage 75 in the side wall of the body 27 to the discharge conduit 201 leading to the reservoir 191.

If, due to a failure of some sort, there were a fall of pressure in one of the two chambers 140 or 143, the pressurisation of the other chamber would not be affected so that power assistance is still applied to one of the braking circuits. As can be seen from the drawing, the plunger 43 is driven by a pair of plungers 39, 41 in the bore 29; the plunger 39 is driven by the pressure obtaining in chamber 141, and the plunger 41 is driven by the pressure obtaining in chamber 143. Thus, even if the pressure in one of the two chambers 141, 143 falls, the pressure in the other chamber will nevertheless urge either the plunger 41, or both the plungers 39 and 41 to displace the plunger 43 as in normal operation of the device. A similar situation obtains in respect of the pressure generator 156 since the two plungers 159 and 177 are respectively driven by the pressure in the chambers 141 and 143 but are in tandem so that the pressure in chamber 141 can drive both plungers 159 and 177 if the pressure in chamber 143 should fail.

In the case of breakdown in the sealing rings of plungers 159 or 39 this will be apparent by a leakage of brake fluid from passages 175 or 47; without these passages such a failure would not be detectable in normal operation of the device.

Figure 2:
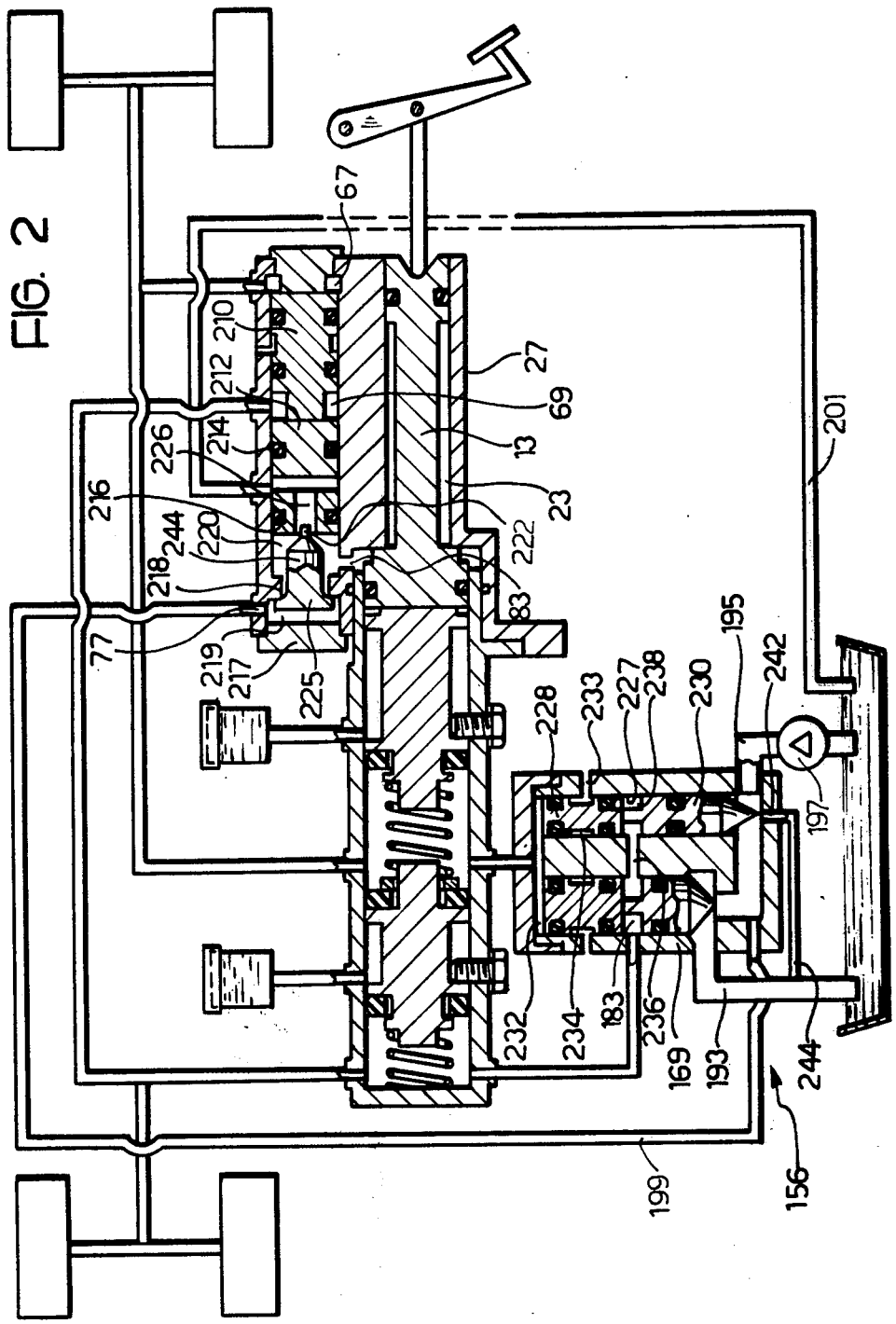
FIG. 2 is a view similar to FIG. 1, of a second embodiment of the invention.

FIG. 2 illustrates a second embodiment of the invention in which many components are identical with elements of the first embodiment. Accordingly only those elements which differ from the first embodiment will be described in detail. In this second embodiment, in the axial bore 29 of the body 27 are two plungers, one a control plunger 210, and one a control and distribution plunger 212. The distribution plunger 212 differs from the corresponding plunger 43 of the first embodiment in that it has two sealing gaskets 214 and 216. The distributor body 27 has an end plug 217 which takes the place of the end wall 31 of the embodiment of FIG. 1. Within the bore 29 there is an annular inwardly projecting ridge 218 situated next to the passage 77 but on the side thereof opposite the plug 217 and which separates the space between the plug 217 and the distributor plunger 212 into two chambers 219 and 220. Within this space there is also located a mushroom shaped element 224 having an enlarged head 225 which is trapped in chamber 219 between the annular ridge 218 and the end plug 217, and a stem having a cone shaped end with an axial spigot-like projection 222 extending into an axial passage 226 in the distributor plunger 212 when the mushroom head 225 of the element 224 rests against the annular ridge 218, without, however, blocking this passage when the distribution plunger 212 is in the position shown in FIG. 2.

The pressure generator device is also different from the corresponding part of the embodiment of FIG. 1, in that the cylinder 169, which in the first embodiment was connected to conduit 147, has a further bore 227 the axis of which is parallel to the axis of the bore 167 but the diameter of which is less. Within this bore 227 slide two further plungers 228 and 230 which are similar to the two plungers 159 and 177 in the bore 167. A single chamber 232 in place of the chamber 157 communicates with both the bore 167 and the bore 227. The plunger 228 has an annular groove 234, and a passage 233 similar to the passage 175 in the wall of the cylinder 169 connects the chamber 183 to the corresponding chamber 238. A conduit 195 from the output of the pump 197 passes the conical end of plunger 230 and aligned with this plunger 230 a passage 242 is machined in the cylinder 169 coaxial with the axis of the bore 227. The passage 242 communicates along a condiut 244 with the conduit 193 which leads from the chamber 187 to the reservoir 191.

The operation of this second embodiment is basically the same as the device illustrated in FIG. 1, in that the generation of pressure for servo-assisting the brake pedal force is controlled by the pressure obtaining in chambers 141 and 143 due to depression of the brake pedal 3.

The increase of pressure in the chambers 141 and 143 upon depression of the brake pedal 3 is transferred to the chamber 232 and the two chambers 183 and 238 of the pressure generating device. The two plungers 177 and 230 are thus displaced with a force proportional to their areas and this displacement is modified by the resistance to displacement experienced at their conical ends due to the pressure generated by the pump 197 which resistance is, again, dependent on the area exposed to the pressure.

Therefore, the plungers 159 and 177, having a greater cross-sectional area, will experience a greater force and will therefore be displaced further than the plungers 228 and 230 whereby to obstruct completely the flow of brake fluid from the pump 197 into the discharge conduit 193 thereby increasing the pressure in the conduit 199. The pressure in the conduit 199 is modified, however, by the leakage of brake fluid through the passage 242 and conduit 244 which is still partly open. With an increase of pressure in chambers 141 and 143 the pressure on plungers 228 and 230 will also increase causing them to approach the passage 242 more closely, thereby further increasing the pressure in conduit 199 by further reducing the cross sectional area of the discharge passage 242.

The pressure generated by initial depression of the brake pedal 3 is transferred as in the embodiment of FIG. 1, to the chambers 67 and 69 and therefore causes plungers 210 and 212 to displace against element 224 in such a way that its conical part closes the passage 226 thereby preventing communication between the chamber 23 and the discharge conduit 201. Upon further displacement these plungers dislodge the mushroom head 225 of the element 224 from the annular ridge 218 thus permitting brake fluid under pressure from conduit 199 to flow into the chamber 23 through the chambers 219, 220 and passage 83, whereby to exert the servo-braking action on the enlarged end 17 of plunger 13 as described above in relation to FIG. 1.

When the pressure in the chamber 23 is equalised with that in the chambers 141 and 143 the pressure acting on the end face of the element 224 urges the plungers 210 and 212 back along the bore 29 until the passage between the head 225 and the annular ridge 218 is closed. The pressure in chambers 67 and 69 holds the plungers 210 and 212 pressed against the conical end of the element 224 so that the passage 226 still remains obstructed. Control of the servobraking force is thus obtained in the same way as in the first embodiment. In the event of a failure of the type discussed in relation to the first embodiment the behaviour of this second embodiment is practically the same as that of the first embodiment.

Figure 3:
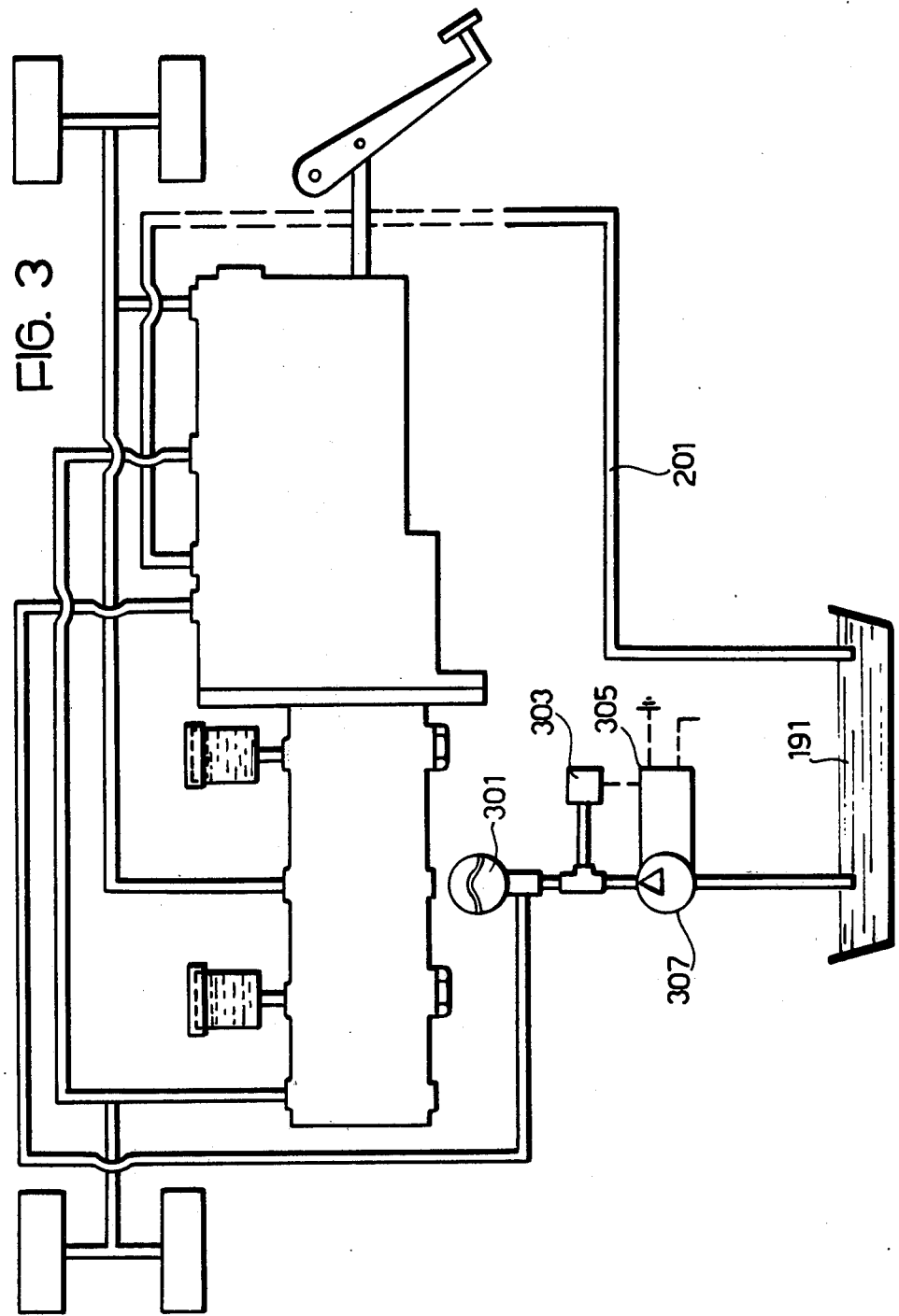
FIG. 3 is a schematic view of a third embodiment of the invention.

In FIG. 3 is shown a third embodiment of the invention, which differs from the other two embodiments in respect of the pressure generator identified in FIG. 1 by the reference numeral 156. In the embodiment of FIG. 3 this pressure generator, and also the conduits 147 and 151 which connected it to chambers 141 and 143 of the master cylinder have been dispensed with. The conduit 199 is connected to a pressure accumulator 310 controlled by a pressure switch 303 which controls through a unit 305 an electric pump 307 which draws brake fluid from the reservoir 191. The discharge pipeline 201 is the same as in the previous two embodiments.

The master cylinder and distribution valves of this third embodiment may be the same as that described for the first embodiment or that described for the second embodiment. The pressure which is generated by the pump 307 is regulated by the switch 303, which connects or disconnects the pump upon the attainment of minimum or maximum threshold pressures respectively in the accumulator 301. The pressure in the accumulator 301 is fed along the conduit 199 exactly as in embodiments of FIGS. 1 and 2. Any possible breakdown in pump 307 or of the other parts 303 and 301 will thus only lead to a loss of the servo-braking force, and the brakes of the vehicle can still be operated by applying a greater force to the brake pedal 3.

We claim:
1. A servo-assisted hydraulic braking system having:
   a master cylinder closed at one end by an end wall,
   first and second master cylinder plungers within said master cylinder, said master cylinder plungers defining between them a first master cylinder chamber, one of said master cylinder plungers defining a second master cylinder chamber between itself and said end wall of said master cylinder,
   a driving piston slidable along said master cylinder and displaceable by the brake pedal of said braking system, such displacement also causing displacement of said first and second master cylinder plungers to control the pressure in said first and second master cylinder chambers,
   means defining a driving piston chamber within said master cylinder, said driving piston forming at least one wall of said driving piston chamber,
   a distributor device,
   a pressure generator,
   means fluidly connecting said distributor device to said pressure generator,
   means fluidly connected said distributor device to said driving piston chamber,
   means fluidly connecting said first and second master cylinder chambers to said distributor device whereby to control said distributor device to feed pressure from said pressure generator to said driving piston chamber to reinforce the force applied to said driving piston by said brake pedal,
   said distributor device comprising:
   a distributor body,
   means defining a cylindrical bore in said distributor body,
   first and second end walls defining opposite ends of said cylindrical bore,
   at least one control plunger sliding in said cylindrical bore said control plunger defining a control chamber between itself and said first end wall of said cylindrical bore of said distributor body,
   said means for fluidly connecting said first and second master cylinder chambers to said distributor device include means fluidly connecting said control chamber of said distributor to one of said first and second master cylinder chambers, a distribution plunger sliding in said cylindrical bore in said distributor body between first and second end positions, said distribution plunger defining a distribution chamber between itself and said second end wall of said cylindrical bore of said distributor body, means defining a transverse passage in said distribution plunger, said transverse passage permitting communication between said pressure generating device and said distribution chamber of said distributor when said distribution plunger is in said second position thereof and preventing such communication when said distribution plunger is in said first position thereof, displacement of said distribution plunger between said first and second positions being controlled by the pressure in said control chamber of said distributor.

2. A servo-assisted hydraulic braking system as in claim 1, wherein there are two control plungers in said cylindrical bore of said distributor body, said two control plungers defining between them a further control chamber, and said means for fluidly connecting said first and second master cylinder chambers to said distributor device comprise means fluidly connecting the two control chambers of said distributor to respective ones of said first and second master cylinder chambers.

3. A servo-assisted hudraulic braking system as in claim 1 including a brake fluid reservoir, means defining a first opening in the side wall of said distributor body, means fluidly connecting said first opening to said brake fluid reservoir, means defining a second opening in the side wall of said distributor body, said means fluidly connecting said distributor device to said pressure generator comprise means fluidly connecting said second opening in said side wall of said distributor body with said pressure generator, said transverse passage in said distributor plunger being aligned with said first opening when said plunger is in said first position and with said second opening when said plunger is in said second position.

4. A servo-assisted hydraulic braking system as in claim 1, wherein there is an internal passageway within said distributor device, said internal passageway communicating with said driving piston chamber and being aligned with said transverse passage in said distribution plunger when said distribution plunger is in said second position.

5. A servo-assisted hydraulic braking system as in claim 1, wherein said control plunger and said distribution plunger of said distributor device define between them a further control chamber, said means for fluidly connecting said first and second master cylinder chambers to said distributor device further including means fluidly connecting said further control chamber to the other of said first and second master cylinder chambers.

* * * * *